T
United States Patent [19]

Dieck et al.

[11] 4,110,421

[45] Aug. 29, 1978

[54] CATALYTIC PROCESS FOR THE PREPARATION OF PHOSPHAZENE POLYMERS

[75] Inventors: Ronald L. Dieck; Alan B. Magnusson, both of Lancaster, Pa.

[73] Assignee: Armstrong Cork Company, Lancaster, Pa.

[21] Appl. No.: 731,745

[22] Filed: Oct. 12, 1976

[51] Int. Cl.$^2$ ............................................. C01B 25/10
[52] U.S. Cl. .................................................. 423/300
[58] Field of Search ........................ 423/300; 260/2 P

[56] References Cited

U.S. PATENT DOCUMENTS 4,005,171  1/1977  Reynard et al. ..................... 423/300

Primary Examiner—O. R. Vertiz
Assistant Examiner—Gregory A. Heller
Attorney, Agent, or Firm—Richard J. Hammond

[57] ABSTRACT

A process is disclosed for the catalytically-induced preparation of phosphazene polymers. Cyclic halophosphazenes are polymerized in the presence of a catalytically sufficient amount of a compound having the formula $M(OR')_x$ where M is an alkali metal or alkaline earth metal, $x$ is equal to the valence of the metal and R' is $C_1$ to $C_{10}$ linear or branched alkyl, $C_1$ to $C_{10}$ substituted linear or branched alkyl, the substituent selected from the group consisting of nitro, $C_1$ to $C_{10}$ alkyl, $C_1$ to $C_{10}$ alkoxy, $C_6$ to $C_{10}$ aryl and $C_6$ to $C_{10}$ aryloxy, or $N_3P_3Cl_x(OR')_{6-z}$ wherein R' is as defined above and $z$ equals 0 to 5.

5 Claims, No Drawings

CATALYTIC PROCESS FOR THE PREPARATION OF PHOSPHAZENE POLYMERS

BACKGROUND OF THE INVENTION

The present invention relates to a process for the preparation of phosphazene polymers. More specifically, the present invention relates to a method for catalytically producing polyphosphazenes.

DESCRIPTION OF THE PRIOR ART

Preparation of the polyphosphazenes has generally been recognized to be most readily accomplished by the technique of Allcock, et al as disclosed in U.S. Pat. No. 3,370,020. The preparation involves the use of the cyclic trimer, hexachlorocyclotriphosphazene as the sole starting material in what is essentially a melt polymerization technique. Purified trimer is thermally polymerized under sealed tube conditions at about 250° C. for 20 to 48 hours to give substantially linear poly(dichlorophosphazene) and some unreacted trimer. The cyclic tetramer also is effective in this reaction. While the product of this reaction, poly(dichlorophosphazene), itself is a good elastomer of very high molecular weight, e.g. over one million, it suffers the severe disadvantage of undergoing relatively facile hydrolytic cleavage of the P-Cl bond followed by degradation of the polymer. The prior art has shown that attempts to increase the stability of the dichloropolymer by continued heating have proved ineffective since the highly crosslinked rubbery material produced by such heating is also hydrolytically unstable. Recent success for obtaining polyphosphazene polymers of good hydrolytic stability has been achieved by substituting all of the halogen on the linear polymer produced from the cyclic trimer by various organic species. The following scheme discloses the state of the prior art to date in which high molecular weight polyphosphazenes are produced by treating poly(dichlorophosphazene) I with a variety of organic nucleophiles, e.g. alcohols, phenols, and amines, to obtain the corresponding completely substituted polymers II, III and IV which are hydrolytically stable.

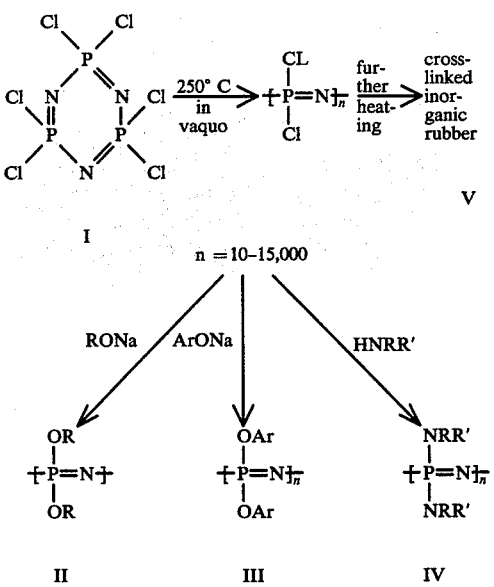

The time period for accomplishing the ring opening polymerization reaction is economically disadvantageous, and considerable effort has been expended ascertaining what catalysts could be employed to successfully promote such ring opening polymerization. A variety of investigators have found that carboxylic acids, ethers, ketones, alcohols, nitromethane and metals such as zinc, tin or sodium, enhance the rate of polymerization of the cyclic trimer. The rate of enhancement is such that extensive polymerization is induced in 24 hours at 210° C. compared to only 3% conversion to polymer in the same time in the absence of any catalyst. Comparable catalytic activity has also been shown by sulfur (at 215°–254° C.), by dialkyl paracresols and quinone or hydroquinone. See, for example, Allcock, "Phosphorus Nitrogen Compounds", Academic Press 1972, page 316 and following.

The mechanism proposed for such catalytic enhancement in the conversion of the cyclic trimer to the linear polymer suggests that reagents that facilitate removal of chloride ion from phosphorus should be active catalysts. However, a variety of compounds, including those that should be good chloride acceptors, have been found to have no effect on the polymerization including carbon tetrachloride, chloroform, ligroin, benzene, biphenyl, cyclohexane, ethylbromide, phosphorus pentachloride, ammonia, water, mercuric chloride, aluminum chloride and stannic chloride.

While the earlier discussed catalysts are effective for the purpose of catalyzing the ring-opening polymerization reaction, one of their major drawbacks is that the polymerization actually promotes the crosslinking reaction. Thus, while the disappearance of the cyclic trimer is enhanced, the resulting crosslinked polymer not only suffers the disadvantages of the prior art hydrolytically unstable crosslinked polychlorophosphazene V, but is additionally less reactive to the earlier mentioned nucleophiles due to its inherent insolubility. Further, there is no effective way to control molecular weight of the final product, such being so high as to make difficult any further manipulation such as melt or solution casting.

There is, therefore, a need for effective catalysts to produce linear polyphosphazenes.

SUMMARY OF THE INVENTION

It is an object of the present invention to provide a novel process for the production of phosphazene polymers.

It is a further object of the present invention to provide a novel process for the production of phosphazene polymeric foams.

It is an additional object of the present invention to provide a novel process for the production of low molecular weight phosphazene polymers and foams from such low molecular weight polyphosphazenes.

It is another object of the present invention to provide a novel process for the production of low molecular weight phosphazene polymers and foams from such low molecular weight polyphosphazenes which comprises thermally polymerizing a cyclic phosphazene with a catalytically sufficient amount of an alkali or alkaline earth metal compound.

It is a further object of the present invention to provide a novel process for the production of low molecular weight phosphazene polymers and foams therefrom which comprises thermally polymerizing a cyclic phosphazene with a catalytically sufficient amount of an alkoxy-substituted cyclotriphosphazene.

These and other objects of the present invention will become more apparent to those skilled in the art upon reading the more detailed description thereof set forth hereinbelow.

DESCRIPTION OF THE PREFERRED EMBODIMENTS

Extensive testing of a large variety of alkali metal, alkaline earth metal, organo metallic and organic catalysts in cyclic phosphazene systems has disclosed that while they vary somewhat in their activity, all the catalytically active compounds, in accordance with the present invention, have alkoxide character. By the term "alkoxide character" is meant catalysts formed of radicals wherein an oxygen atom is attached directly to another group to form a radical of the general formula

(R'O—)

wherein R' is linear or branched alkyl radical having from 1 to 10 carbon atoms or substituted linear or branched alkyl radical having from 1 to 10 carbon atoms, the substituents being halogen, nitro, $C_1$ to $C_{10}$ alkyl, $C_1$ to $C_{10}$ alkoxide, $C_6$ to $C_{10}$ aryl or $C_6$ to $C_{10}$ aryloxy. Preferably R' is alkyl having from 1 to 4 carbon atoms, such being linear or branched.

In one embodiment of the present invention, the radical R' is combined with an alkali or alkaline earth metal M to form the catalytic compound

M(OR')$_x$ wherein M is any Group I or II metal of the Periodic Table such as lithium, sodium, potassium, magnesium, or calcium, and $x$ is equal to the valence of the metal. For the sake of simplicity, these catalysts will hereinafter be referred to as metal alkoxide catalysts. Accordingly, the phosphazene polymers can be prepared by a one-step process in which the metal alkoxide catalyst is admixed with a cyclic compound of the formula (NPCl$_2$)$_y$ wherein $y$ is 3, 4, or mixtures of 3 and 4 and thermally polymerized.

It is preferred to carry out the catalytically-induced thermal polymerization by heating the phosphazene compound at a temperature and for a length of time ranging from about 5 hours at 250° C. to about 400 hours at 140° C., preferably in the absence of oxygen and most preferably in the presence of a vacuum of at least $10^{-1}$ Torr. That is to say, the compounds are heated to a temperature ranging from about 140° C. to 250° C. for about 5 hours to 400 hours, the higher temperatures necessitating shorter contact times and the lower temperatures necessitating longer contact times. At temperatures higher than 250° C., i.e. 300° C., cross-linking of the ring-opened material becomes significant in these catalyzed systems. The compounds must be heated for such a length of time that only a minor amount of unreacted charge material remains and a major amount of polymeric non-cross-linked material has been produced. Such a result is generally achieved by following the conditions of temperature and contact time as specified above. Preferably, temperatures of 175°–250° C. are employed at times of 5 to 300 hours.

While the ring-opening polymerization is most advantageously carried out in the melt phase, a judicious selection of solvents can also be employed so as to effect the reaction in solution. However, the reactivitiy of the cyclic phosphazenes with materials having available protons is well known and the common hydrocarbon solvents, such as benzene and the like, or the high boiling solvents, such as diglyme, dimethylformamide and the like, should be avoided. When solvents are used in the ring-opening polymerization, such should be inert to any reaction with the cyclic phosphazene at the temperature of polymerization and are preferably polyhalocarbon solvents such as carbon tetrachloride, perchloroethylene and various solvents generally described as Freon solvents, but such having no available hydrogen atoms present in the molecule.

It is preferred that the catalytically-induced thermal polymerization be carried out in the presence of an inert gas such as nitrogen, neon, argon, or in a vacuum of less than about $10^{-1}$ Torr, inasmuch as the reaction proceeds very slowly in the presence of air. The use of any particular inert gas, however, is not critical.

The polymers resulting from the thermal polymerization portion of this process are in the form of a polymeric mixture of different polymers of different chain lengths. That is to say, the product of the thermal polymerization is a mixture of polymers having the formula

—(NPCl$_2$)$_n$— wherein $n$ ranges from about 6 to about 11,000. The recovered polymer contains phosphazene polymer, preferably having a weight average molecular weight of from about 60,500 to about 180,000, as well as some unreacted starting material. The recovered polymer is, however, actually a mixture of polymers, generally having a molecular weight distribution that is commonly termed bimodal, i.e., having two statistical modes. Thus, in these catalytically-induced thermally polymerized polymers, the recovered polymers have weight average molecular weights of about 6,000 to 33,000 for the low molecular weight mode and about 60,000 to 230,000 for the high molecular weight mode.

The amount of catalyst capable of carrying out the thermal polymerization can be very small, the minimum amount being 0.05 mole percent based on the amount of cyclic phosphazene. It is important, however, that excessive amounts of catalyst not be used in the catalytically-induced polymerization reaction. If amounts greater than 10.0 mole percent, based on cyclic phosphazene, are employed in the polymerization reaction, polymerization occurs but yielding highly crosslinked phosphazene compounds. That is to say, a range of from about 0.05 to about 10.0 mole percent is useful to induce the thermal polymerization of phosphazene cyclic trimer, tetramer, or mixtures thereof, preferably from 0.5 to 2.0 mole percent.

Examples of the alkali or alkaline earth metal alkoxides which are useful in the process in accordance with the present invention include:
sodium methoxide
potassium methoxide
sodium octyloxide
lithium octyloxide
potassium octyloxide
magnesium methoxide
magnesium octyloxide
calcium methoxide
calcium octyloxide
sodium decyloxide lithium decyloxide
potassium decyloxide
magnesium decyloxide
calcium decyloxide
sodium chloromethoxide
lithium chloromethoxide
potassium chloromethoxide
calcium chloromethoxide
magnesium chloromethoxide
sodium ortho, meta, or para benzyloxide
potassium n-butoxide
lithium propoxide
calcium ethoxide
sodium ethoxide
lithium-1-methoxyethoxide
sodium-3-t-butoxyoctyloxide
lithium methoxymethoxide
magnesium-4-cyanohexoxide
sodium-8-nitrooctyloxide
potassium-10-nitrodecyloxide
calcium nitromethoxide
sodium iodomethoxide
sodium bromomethoxide
magnesium-10-iodooctyloxide
potassium-8-iodooctyloxide
calcium-6-bromooctyloxide
potassium-2-chlorooctyloxide
potassium-3-chlorooctyloxide
magnesium chloromethoxide
sodium-1-naphthylmethoxide
potassium-2-naphthylmethoxide and the like. In another embodiment in accordance with the present invention, the catalytic compounds having alkoxide character, e.g., having the group (R'O— are those cyclotriphosphazenes of the formula $$N_3P_3Cl_z(OR')_{6-z}$$

where $z$ equals 0 to 5 and R' is as defined above. The synthesis of these catalytic compounds is well known in the prior art, such being described in Inorg. Syn. VIII, page 77. In general, the preparation of these catalytic materials is carried out by reacting in an organic inert solvent solution hexachlorocyclotriphosphazene with a metal alkoxide at about 0° C. The following equation illustrates this reaction for the fully substituted product:

$$(NPCl_2)_3 + 6NaOR' \xrightarrow{0°} [NP(OR')_2]_3 + 6NaCl$$

wherein R' is as defined above.

As in the case of the metal alkoxide catalysts, those phosphazene catalysts are effective in the thermal polymerization at concentrations of as little as 0.05 mole percent. These alkoxide catalysts have an upper limit that is somewhat lower than the metal alkoxide catalysts practically useful in effecting the polymerization reaction. Thus, concentrations of up to 5.0 mole percent are effective for the polymerization reaction in accordance with this embodiment of the present invention. Preferably from 0.05 to 2 mole percent are used for the polymerization process, most preferably 0.1 to 0.5 mole percent based on concentration of cyclic trimer or tetramer.

The exact phenomenon which occurs when polymerizing the cyclic phosphazene starting material used to produce the phosphazene polymers in accordance with the present invention is not completely understood. It is known, however, that the initiation step in the polymerization of $(NPCl_2)_y$ wherein $y$ is 3 or 4 is the heterolytic cleavage of a phosphorus-chlorine bond to produce a cyclic phosphazene cation in accordance with the following equation.

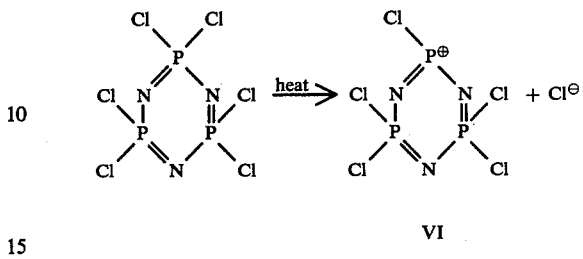

VI

Cation (VI) then electrophilically attacks a neutral $(NPCl_2)_y$ molecule, cleaving its ring and commencing the propagation step in the polymerization reaction as follows:

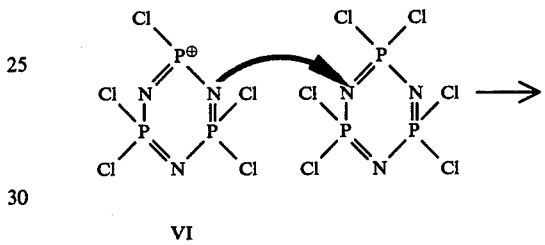

VI

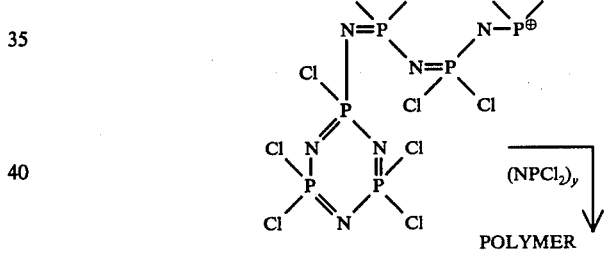

POLYMER

While we do not wish to be bound by any explanation of the catalytically-induced thermal polymerization mechanism or theory in regard thereto, it is possible that the catalysts in accordance with the present invention are those which facilitate the formation of a cyclic cation initiator, that is, other reagents that are similar to (VI) but which form more readily than do cyclic cation (VI). Thus, by such reasoning, a class of additives which function in this manner would be those cyclic oxyphosphazanes (VIIIA) which form by a thermal rearrangement of the corresponding cyclophosphazenes (VII) in the following manner:

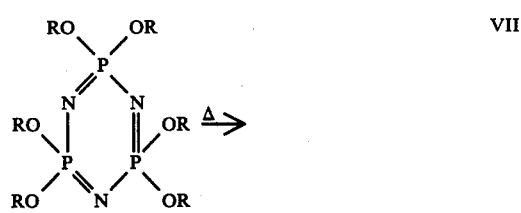

VII

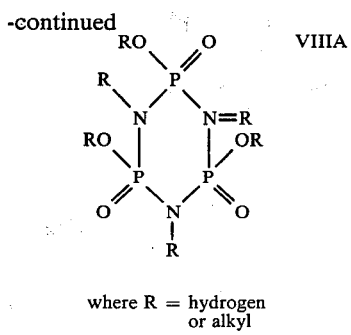

where R = hydrogen or alkyl

Oxyphosphazanes can also be formed from $(NPCl_2)_3$ by the following equation.

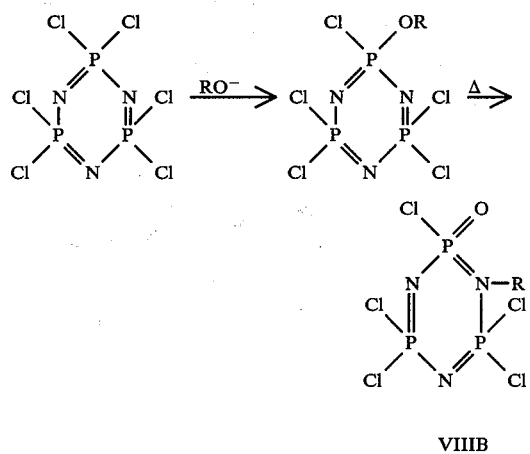

VIIIB

Both phosphazane VIIIA and VIIIB can thermally cleave to zwitterions (IX) to effect the initiator species similar to that accepted as the initiator species in the uncatalyzed thermal polymerization of $(NPCl_2)_y$ raw materials.

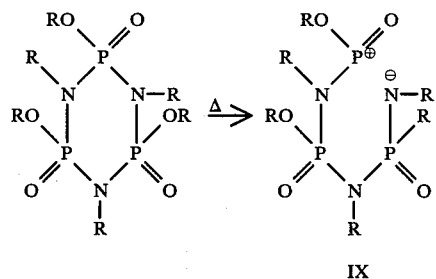

IX

As a second step in the process in accordance with the present invention, thermally stable, water-resistant phosphazene polymers substantially free of halogen are produced from the above-mentioned catalytically formed phosphazene polymer by reaction with specific reagents. These reagents have the formulas:

$M(OC_6H_4-R_1)_x$,
$M(OC_6H_4-R_2)_x$, and, if desired, $M(W)_x$ wherein M is a Group I or Group II metal of the Periodic Table such as lithium, sodium, potassium, magnesium or calcium, $x$ is equal to the valence of the metal M, and $R_1$ and $R_2$ can be the same or different and are alkyl radical having from 1 to 10 carbon atoms, alkoxy having from 1 to 4 carbon atoms, aryl radical having from 6 to 10 carbon atoms, substituted $C_1$ to $C_{10}$ alkyl radical or substituted $C_6$ to $C_{10}$ aryl radical, the substituents being halogen, nitro, cyano, $C_1$ to $C_4$ alkyl, $C_1$ to $C_4$ alkoxy, $C_6$ to $C_{10}$ aryl, or $C_6$ to $C_{10}$ aryloxy radicals. The W represents a group capable of crosslinking chemical reaction, such as, an olefinically unsaturated, preferably ethylenically unsaturated, monovalent radical containing a group capable of further reaction at relatively moderate temperatures and the ratio of $W:R_1 + R_2$ is less than about 1:5. For the sake of simplicity, when copolymers are referred to herein, these may be represented by the formula $[NP(OC_6H_4R_1)_a (OC_6H_4R_2)_b (W)_c]_n$ wherein W, $R_1$, $R_2$, and $n$ are as set forth above and wherein $a + b + c = 2$ and $c \geq 0$. When $c=0$, $a + b = 2$. Examples of W are $-OCH=CH_2$; $-OR_3CH=CH_2$; $-OC(R_3)=CH_2$; $OR_3CF=CF_2$ and similar groups which contain unsaturation, wherein $R_3$ is any aliphatic or aromatic radical, especially $C_2$ to $C_{10}$ alkylene. These groups are capable of further reaction at moderate temperatures (for example, 200°–350° F.) in the presence of free radical initiators, conventional sulfur curing or vulcanizing additivies known in the rubber art or other reagents, often even in the absence of accelerators, using conventional amounts, techniques and processing equipment. Examples of free radical initiators include benzoyl peroxide, bis(2,4-dichlorobenzoyl peroxide), di-t-butyl peroxide, dicumyl peroxide, 2,5-dimethyl(2,5-di-t-butylperoxy)hexane, t-butyl perbenzoate, 2,5-dimethyl-2,5-di(t-butylperoxy)heptyne-3, and 1,1-bis(t-butylperoxy)-3,3,5-trimethylcyclohexane.

Thus, the general peroxide classes which may be used for crosslinking include diacyl peroxides, peroxyesters, and dialkyl peroxides.

Examples of sulfur-type curing systems include vulcanizing agents such as sulfur, sulfur monochloride, selenium disulfide, tellurium disulfide, thiuram disulfide, p-quinone dioximes, polysulfide polymers, and alkyl phenol sulfides. The above vulcanizing agents may be used in conjunction with accelerators, such as aldehyde amines, thio carbamates, thiuram sulfides, guanidines, and thiazols, and accelerator activators, such as zinc oxide or fatty acids, e.g., stearic acid.

It is also possible to use as W in the above formulas, monovalent radicals represented by the formulas (1) $-OSi(OR^4)_2R^5$ and other similar radicals which contain one or more reactive groups attached to silicon; (2) $-OR^6NR^6H$ and other radicals which contain reactive $-NH$ linkages. In these radicals $R^4$, $R^5$ and $R^6$ each represent aliphatic, aromatic and acyl radicals. Like those groups above, these groups are capable of further reaction at moderate temperatures in the presence of compounds which effect crosslinking. The presence of a catalyst to achieve a cure is often desirable. The introduction of groups such as W into polyphosphazene polymers is shown in U.S. Pat. Nos. 3,888,799; 3,702,833; and 3,844,983, which are hereby incorporated by reference.

Aromatic substituted aryloxyphosphazene homopolymers, as disclosed in accordance with the present invention, have higher smoke and lower formability than alkyl substituted aryloxyphosphazene homopolymers. Similarly, in substituted aryloxyphosphazene copolymers, the ratio of $a:b$ and of $(a+b):c$ in those copolymers containing W also affects processability, smoke production and other physical properties. For example, it has been found that when $R_1$ and $R_2$ are the same and are aryloxy, highly crystalline polymers are formed which have higher smoke, and when compounded in foam compositions, show diminished foaming. When $R_1$ and $R_2$ are the same and are long alkyl chains, e.g. $C_5$–$C_{10}$, a phosphazene homopolymer is formed that is soft, easily processed, and less crystalline than the aromatic homopolymers. Further, these polymers exhibit good foamability and low smoke. In the phosphazene copolymers herein (where $R_1$ and $R_2$ are different) and are, for example aryloxy and alkyl, respectively, the ratios of $a:b$ and $(a+b):c$ in copolymers containing W also affect processing properties, foamability and smoke. Thus, when the mole percent of $R_2$ as alkyl decreases, i.e. as more $R_1$ aryloxy is substituted on the aryloxy group attached to the phosphazene chain, the amount of smoke increases, the processing becomes more difficult and the foamability diminishes. It should be understood, however, that even the higher smoke, diminished foamability polymers and copolymers, as disclosed herein, show lower smoke than prior art phosphazene polymers. When W is present, it has been found that when the mole percent of W increases, the degree of crosslinking increases and the ability to be foamed diminishes. Accordingly, it is contemplated that when copolymers are used in accordance with the present invention, and when $R_1$ or $R_2$ is alkoxy having from 1 to 8 carbon atoms, a mole ratio of $a:b$ of at least 1:6 and up to about 6:1, and preferably between about 1:4 and 4:1, are used. It is also contemplated that the mole ratios of $c:(a+b)$ for copolymers or $c:a$ in polymers where $R_1 = R_2$ will be less than about 1:5, preferably from about 1:50 to about 1:10.

The second, or esterification, step of the process comprising treating the mixture resulting from the thermal polymerization step with a compound, or mixture of compounds having the formulas

and, if desired, $M(W)_x$ wherein M, $x$, $R_1$, $R_2$, and W are as specified above.

The polymer mixture is reacted with the above compound or mixture of metal compounds at a temperature and a length of time ranging from about 25° C. for 7 days to about 200° C. for 3 hours.

Again, as in regard to the polymerization step mentioned above, the polymer mixture is reacted with the alkali or alkaline earth metal compound or compounds at a temperature ranging from about 25° C. to about 200° C. for from about 3 hours to about 7 days, the lower temperatures necessitating the longer reaction times and the higher temperatures allowing shorter reaction times. These conditions are, of course, utilized in order to obtain the most complete reaction possible, i.e., in order to insure the complete conversion of all chlorine atoms in the polymer mixture to the corresponding ester of the alkali or alkaline earth starting materials.

The above esterification step is carried out in the presence of a solvent. The solvent employed in the esterification step must have a relatively high boiling point (e.g., about 115° C., or higher) and should be a solvent for both the polymer and the alkali or alkaline earth metal compounds. In addition, the solvent must be substantially anhydrous, i.e., there must be no more water in the solvent or metal compounds than will result in more than 1%, by weight, of water in the reaction mixture. The prevention of water in the system is necessary in order to inhibit the reaction of the available chlorine atoms in the polymer therewith. Examples of suitable solvents include diglyme, triglyme, tetraglyme, toluene and xylene. The amount of solvent employed is not critical and any amount sufficient to solubilize the chloride polymer mixture can be employed. Either the polymer mixture or the alkaline earth (or alkali) metal compounds may be used as a solvent solution thereof in an inert, organic solvent. It is preferred, however, that at least one of the charge materials be used as a solution in a compound which is a solvent for the polymeric mixture.

The amount of alkali metal or alkaline earth metal compound or mixtures thereof employed should be at least molecularly equivalent to the number of available chlorine atoms in the polymer mixture. However, it is preferred that an excess of the metal compound be used in order to assure complete reaction of all the available chlorine atoms. Generally, for copolymers the ratio of the individual alkali metal or alkaline earth metal compounds in the combined mixture governs the ratio of the groups attached to the polymer backbone. However, those skilled in the art readily will appreciate that the nature and, more particularly, the steric configuration of the metal compounds employed may effect their relative reactivity. Accordingly, the ratio of $R_1$'s and $R_2$'s in the esterified product, if necessary, may be controlled by employing a stoichiometric excess of the slower reacting metal compound.

Examples of alkali or alkaline earth metal compounds which are useful in the process of the present invention include:

sodium phenoxide
potassium phenoxide
sodium p-methoxyphenoxide
sodium o-methoxyphenoxide
sodium m-methoxyphenoxide
lithium p-methoxyphenoxide
lithium o-methoxyphenoxide
lithium m-methoxyphenoxide
potassium p-methoxyphenoxide
potassium o-methoxyphenoxide
potassium m-methoxyphenoxide
magnesium p-methoxyphenoxide
magnesium o-methoxyphenoxide
magnesium m-methoxyphenoxide
calcium p-methoxyphenoxide
calcium o-methoxyphenoxide
calcium m-methoxyphenoxide
sodium p-ethoxyphenoride
sodium o-ethoxyphenoride
sodium m-ethoxyphenoride
potassium p-ethoxyphenoxide
potassium o-ethoxyphenoxide
potassium m-ethoxyphenoxide
sodium p-n-butoxyphenoxide
sodium m-n-butoxyphenoxide
lithium p-n-butoxyphenoxide
lithium m-n-butoxyphenoxide
potassium p-n-butoxyphenoxide
potassium m-n-butoxyphenoxide
magnesium p-n-butoxyphenoxide magnesium m-n-butoxyphenoxide
calcium p-n-butoxyphenoxide
calcium m-n-butoxyphenoxide
sodium p-n-propoxyphenoxide
sodium o-n-propoxyphenoxide
sodium m-n-propoxyphenoxide
potassium p-n-propoxyphenoxide
potassium o-n-propoxyphenoxide
potassium m-n-propoxyphenoxide
sodium p-methylphenoxide
sodium o-methylphenoxide
sodium m-methylphenoxide
lithium p-methylphenoxide
lithium o-methylphenoxide
lithium m-methylphenoxide
sodium p-ethylphenoxide
sodium o-ethylphenoxide
sodium m-ethylphenoxide
potassium p-n-propylphenoxide
potassium o-n-propylphenoxide
potassium m-n-propylphenoxide
magnesium p-n-propylphenoxide
sodium p-isopropylphenoxide
sodium o-isopropylphenoxide
sodium m-isopropylphenoxide
calcium p-isopropylphenoxide
calcium o-isopropylphenoxide
calcium m-isopropylphenoxide
sodium p-sec butylphenoxide
sodium m-sec butylphenoxide
lithium p-sec butylphenoxide
lithium m-sec butylphenoxide
lithium p-tert. butylphenoxide
lithium m-tert. butylphenoxide
potassium p-tert. butylphenoxide
potassium m-tert. butylphenoxide
sodium p-tert. butylphenoxide
sodium m-tert. butylphenoxide
sodium propeneoxide
sodium p-nonylphenoxide
sodium m-nonylphenoxide
sodium o-nonylphenoxide
sodium 2-methyl-2-propeneoxide
potassium buteneoxide and the like.

The second step of the process results in the production of a homopolymer having the formula

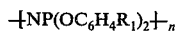

or a copolymer mixture having the formula

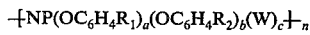

wherein $n$, $R_1$, $R_2$ and W are as specified above, where $c$, but not $a$ and $b$ can be zero, and where $a + b + c = 2$, and the corresponding metal chloride salt. It should be noted herein that these polymers also have the bimodal molecular weight distribution characteristic of the ringopened, halogen-containing polymer.

The polymeric reaction mixture resulting from the second or esterification step is then treated to remove the salt which results upon reaction of the chlorine atoms of the polymer mixture with the metal of the alkali or alkaline earth metal compounds. The salt can be removed by merely precipitating it out and filtering, or it may be removed by any other applicable method, such as by washing the reaction mixture with water after neutralization thereof with, for example, an acid such as hydrochloric acid.

The next step in the process comprises fractionally precipitating the polymeric material to separate out the high polymer from the low polymer and any unreacted trimer. The fractional precipitation is achieved by the, preferably dropwise, addition of the esterified polymer to a material which is a non-solvent for the high polymer and a solvent for the low polymer and unreacted trimer. That is to say, any material which is a non-solvent for the polymers wherein $n$ is higher than 350 and a solvent for the remaining low polymers may be used to fractionally precipitate the desired polymers. Examples of materials which can be used for this purpose include hexane, diethyl ether, carbon tetrachloride, chloroform, dioxane, methanol, water and the like. The fractional precipitation of the esterified polymeric mixture generally should be carried out at least twice and preferably at least four times in order to remove as much of the low polymer from the polymer mixture as possible. The precipitation may be conducted at any temperature, however, it is preferred that room temperature be employed. The novel high molecular weight polymer may then be recovered by filtration, centrifugation, decantation or the like.

The novel phosphazene polymers of this invention, as mentioned above, are very thermally stable. They are soluble in specific organic solvents such as tetrahydrofuran, benzene, xylene, toluene, dimethylformamide and the like and can be formed into films from solutions of the copolymers by evaporation of the solvent. Significantly, they are water resistant at room temperature and do not undergo hydrolysis at high temperatures. The polymers may be used to prepare films, fibers, coatings, molding compositions and the like. They may be blended with such additives as antioxidants, ultraviolet light absorbers, lubricants, plasticizers, dyes, pigments, fillers such as litharge, magnesia, calcium carbonate, furnace black, alumina trihydrate and hydrated silicas, other resins, etc., without detracting from the scope of the present invention.

The homopolymers and copolymers may be used to prepare foamed product which exhibit excellent fire retardance and which produce low smoke levels, or essentially no smoke when heated in an open flame. The foamed products may be prepared from filled or unfilled formulations using conventional foam techniques with chemical blowing agents, i.e. chemical compounds stable at original room temperature which decompose or interact at elevated temperatures to provide a cellular foam. Suitable chemical blowing agents include:

| Blowing Agent | Effective Temperature Range ° C |
|---|---|
| Azobisisobutyronitrile | 105–120 |
| Azo dicarbonamide(1,1-azobisformamide) | 100–200 |
| Benzenesulfonyl hydrazide | 95–100 |
| N,N'-dinitroso-N,N'-dimethyl terephthalamide | |
| Dinitrosopentamethylenetetramine | 130–150 |
| Ammonium carbonate | 58 |
| p,p'-oxybis-(benzenesulfonyl-hydrazide) | 100–200 |
| Diazo aminobenzene | 84 |
| Urea-biuret mixture | 90–140 |
| 2,2'-azo-isobutyronitrile | 90–140 |
| Azo hexahydrobenzonitrile | 90–140 |
| Diisobutylene | 103 |
| 4,4'-diphenyl disfulfonylazide | 100;14 130 |

Typical foamable formulations include:

| Phosphazene copolymer (e.g., $[NP(OC_6H_5)(OC_6H_4\text{-}p\text{-}OCH_3)]_n$ 100 parts | |
|---|---|
| Filler (e.g., alumina trihydrate) | 0–100 phr |
| Stabilizer (e.g., magnesium oxide) | 2.5–10 phr |
| Processing aid (e.g., zinc stearate) | 2.5–10 phr |
| Plasticizer resin (e.g., Cumar P-10, coumarone indene resin) | 0–50 phr |
| Blowing agent (e.g., 1,1′-azobisformamide) | 10–50 phr |
| Activator (e.g., oil-treated urea) | 10–40 phr |
| Peroxide curing agent (e.g., 2,5-dimethyl-2,5-di(t-butylperoxy)hexane) | 2.5–10 phr |
| Peroxide curing agent (e.g., benzoyl peroxide) | 2.5–10 phr |

While the above are preferred formulation guidelines, obviously some or all of the adjuvants may be omitted, replaced by other functionally equivalent materials, or the proportions varied, within the skill of the art of the foam formulator.

In one suitable process, the foamable ingredients are blended together to form a homogeneous mass; for example, a homogeneous film or sheet can be formed on a 2-roller mill, preferably with one roll at ambient temperature and the other at moderately elevated temperature, for example 100°–120° F. The homogeneous foamable mass can then be heated, to provide a foamed structure; for example, by using a mixture of a curing agent having a relatively low initiating temperature, such as benzoyl peroxide, and a curing agent having a relatively high initiating temperature, such as 2,5-dimethyl-2,5-di(t-butylperoxy)hexane, and partially precuring in a closed mold for about 6–30 minutes at 200°–250° F., followed by free expansion for 30–60 minutes at 300°–350° F. In the alternative, the foaming may be accomplished by heating the foamable mass for 30–60 minutes at 300°–350° F. using a high temperature or low temperature curing agent, either singly or in combination. One benefit of utilizing the "partial precure" foaming technique is that an increase in the molecular weight of the foamable polymer prior to the foaming step enables better control of pore size and pore uniformity in the foaming step. The extent of "precure" desired is dependent upon the ultimate foam characteristics desired. The desired foaming temperature is dependent on the nature of the blowing agent and the crosslinkers present. The time of heating is dependent on the size and shape of the mass being foamed. The resultant foams are generally light tan to yellowish in appearance, and vary from flexible to semirigid, depending upon the glass transition temperature of the copolymer employed in the foam formulation, that is to say, the lower the glass transition of the copolymer the more flexible will be the foam produced therefrom. As indicated, inert, reinforcing or other fillers such as alumina trihydrate, hydrate silicas or calcium carbonate can be added to the copolymer foams and the presence of these and other conventional additives should in no way be construed as falling outside the scope of this invention.

Also, as mentioned above, the homopolymers and copolymers of this invention can be crosslinked at moderate temperatures by conventional free radical curing techniques and in copolymers with minor amounts of unsaturated groups W present in the copolymer backbone with conventional sulfur curing techniques. The ability of these polymers to be cured at temperatures below about 350° F. makes them particularly useful as potting and encapsulation compounds, sealants, coatings and the like. The copolymers are also useful for preparing crosslinked foams which exhibit significantly increased tensile strengths over uncured foams. These copolymers are often crosslinked in the presence of inert, reinforcing or other fillers and the presence of these and other conventional additives are deemed to be within the scope of this invention.

The following examples are set forth for purposes of illustration only and are not to be construed as limitations of the present invention except as set forth in the appended claims. All parts and percentages are by weight unless otherwise indicated.

EXAMPLE 1

To a 15 ml tared pyrex glass polymerization tube was added 0.0307 g. sodium methoxide, and 10.2 g. hexachlorocyclotriphosphazene which had been purified by crystallization from heptane and distillation. The concentration of $NaOCH_3$ was, therefore, 0.3 weight percent or 1.9 mole percent. The above operations were carried out in a nitrogen-filled dry box. The tube containing the trimer and catalyst was connected to a vacuum pump and evacuated for 30 minutes to $10^{-2}$ Torr, then sealed while still under vacuum. The tube was then heated in an oven at 175° C. for 312 hours, at which time the viscosity had increased until the material would barely flow when the tube was inverted at the reaction temperature.

EXAMPLE 2

The poly(dichlorophosphazene) prepared in Example 1 was opened in the dry box and the contents dissolved in 150 ml toluene. The toluene solution of $(NPCl_2)_n$ was added dropwise to a stirred solution of sodium p-isopropylphenoxide (previously prepared by the reaction of 4.8 g, 0.208 moles sodium with 28.7 g, 0.211 moles p-isopropylphenol in 175 ml diglyme). The reaction solution was then heated with stirring at 115° for 70 hours. After cooling to 85°, the reaction mixture was poured into 1500 ml methanol to precipitate the polymer. After 2 hours stirring, the methanol was decanted, replaced with fresh methanol and allowed to remain for 65 hours. The methanol was then replaced with water and allowed to stand overnight. The water was poured off, the polymer rinsed in methanol and then dried under vacuum. The yield of dry poly bis(p-isopropylphenoxy)phosphazene was 29% based on the original hexachlorocyclotriphosphazene. After further purification by dissolving in THF and precipitating into water and drying, GPC analysis showed a bimodal molecular weight distribution with a Mw of 284,000 and a Mw/Mn value of 14.3. See Table, Example 2.

COMPARATIVE

A control sample of $(NPCl_2)_3$ without added catalyst, treated in the same way as Example 1, showed no apparent increase in viscosity after 328 hours at 175°, e.g. no ring-opening polymerization had occurred. See Table, Comparative.

EXAMPLE 3

Using the same procedure as in Example 1, hexaethoxycyclotriphosphazene (0.3 weight percent, 0.26 mole percent) was added to $(NPCl_2)_3$. The time required for polymerization was 145 hours at 175°. The hexaethoxycyclotriphosphazene was prepared by the method of Fitzsimmons and Shaw, Inorg. Syn. VIII, p. 77.

EXAMPLE 4

Using the same procedure as in Example 2, a toluene solution of the $(NPCl_2)_n$ prepared in Example 3 was added to a solution of sodium p-isopropylphenoxide in diglyme. The yield of dry polymer was 21.7%. Analysis of purified polymer on GPC showed a bimodal molecular weight distribution with Mw = 185,000 and Mw/Mn = 13.3. See Table, Example 4.

Other examples are illustrated in the following table. The procedure used in these illustrative examples is identical to that of Examples 1–4.

Examples 5–18

| | $(NPCl_2)_3$ Ring Opening Polymerization | | | | $(NPCl_2)_n$ Substitution | |
|---|---|---|---|---|---|---|
| | | | Polymerization | | | |
| Example | Catalyst Species | Concentration Mole % | Time Hours | Temp. °C. | Yield % | Mw$^a$ | Mw/Mn |
| 2 | $M(OR')_x$ | 1.90 | 312 | 175 | 29.0$^b$ | 284,000 | 14.3 |
| | $\overline{NaOCH_3}$ | | | | | | |
| 5 | " | 0.26 | 328 | 175 | 11.3$^b$ | 501,000 | 17.6 |
| 6 | " | 3.80 | 62 | 175 | 29.7$^b$ | Not Determined | |
| 7 | " | 0.50 | 234 | 200 | 24.9$^b$ | Not Determined | |
| 8 | " | 1.00 | 100 | 200 | 23.3$^b$ | 509,000 | 18.4 |
| 9 | " | 1.90 | 59 | 200 | 28.6$^b$ | Not Determined | |
| 10 | " | 3.80 | 23 | 200 | 26.1$^b$ | Not Determined | |
| 11 | " | 1.90 | 8 | 250 | 34.6$^b$ | Not Determined | |
| 12 | " | 1.90 | 63 | 200 | 30.0$^c$ | 213,000 | 11.4 |
| 4 | $N_3P_3Cl_z(OR')_{6-z}$ | 0.26 | 145 | 175 | 21.7$^b$ | 185,000 | 13.3 |
| | $\overline{N_3P_3(OC_2H_5)_6}$ | | | | | | |
| 13 | " | 0.50 | 18 | 175 | 18.1$^b$ | Not Determined | |
| 14 | " | 0.10 | 33 | 200 | 8.2$^b$ | Not Determined | |
| 15 | " | 0.20 | 19 | 200 | 25.2$^b$ | 316,000, | 15.2 |
| 16 | " | 0.10 | 5.5 | 250 | 18.0$^b$ | Not Determined | |
| 17 | " | 0.20 | 13 | 200 | 22.5$^d$ | 343,000 | 8.2 |
| 18 | " | 0.50 | 11 | 200 | 17.0$^e$ | Not Determined | |
| | Comparative | — | 328 | 175 | | no polymerization | |
| | " | — | 464 | 200 | | no polymerization | |
| | " | — | 15.0 | 250 | 38.0$^b$ | 1,450,000 | 42.5 |

$^a$by Waters Model #200 Gel Permeation Chromatograph
$^b$the reaction product of $(NPCl_2)_n$ with sodium p-isopropylphenoxide
$^c$the reaction product of $(NPCl_2)_n$ with sodium phenoxide/sodium p-sec butylphenoxide in the ratio of 1:1
$^d$the reaction product of $(NPCl_2)_n$ with sodium methoxyphenoxide/sodium p-isopropylphenoxide in the ratio of 1:1
$^e$the reaction product of $(NPCl_2)_n$ with sodium p-methoxyphenoxide/sodium p-chlorophenoxide in a ratio of 1:1 having 3 mole % of the substitution 4-pentene-1-oxide

EXAMPLE 19

To 100 parts of the copolymer prepared in accordance with Example 18, there were added 100 parts of alumina trihydrate, 5 parts of magnesium oxide, 10 parts of zinc stearate, 2 parts of CUMAR P-10 (p-coumarone-indene resin), 20 parts of Celogen AZ (1,1'-azobisformamide), 5 parts of BIK-OT (an oil treated urea) as an activator, 6 parts of 2,5-dimethyl-2,5-di(t-butyl peroxy)-hexane, 2 parts of benzoyl peroxide (78% active), and 1 part of dicumyl peroxide. The above ingredients were milled to insure homogeneous mixing of all materials and were then precured in an open sided mold for 1 minute at 210° F. under 2000 psi. The precured copolymer was then free expanded in a circulating air oven for 30 minutes at 300° F. The resultant foam was light tan and flexible, having a foam density of 11.4 pounds/ft.$^3$.

What is claimed is:

1. The process for preparing a phosphazene polymer which comprises heating a cyclic compound of the formula $(NPCl_2)_y$ where $y$ is 3, 4, or mixtures thereof at 140°–250° in an inert atmosphere with a catalytically sufficient amount of a compound having the formula $N_3P_3Cl_z(OR')_{6-z}$ wherein R' is $C_1$ to $C_{10}$ linear or branched alkyl, $C_1$ to $C_{10}$ substituted linear or branched alkyl, the substituent selected from the group consisting of halogen, nitro, $C_1$ to $C_{10}$ alkyl, $C_1$ to $C_{10}$ alkoxy, $C_6$ to $C_{10}$ aryl and $C_6$ to $C_{10}$ aryloxy radicals and $z$ equals 0 to 5.

2. The process in accordance with claim 1 wherein said thermal polymerization is carried out in an inert atmosphere for from 5 to 400 hours.

3. The process in accordance with claim 1 wherein said cyclic compound is hexachlorocyclotriphosphazene or octochloro cyclotetraphosphazene.

4. The process for preparing a phosphazene polymer which comprises heating hexachlorotriphosphazene at 140°–250° C. in an inert atmosphere with 0.05 to 5.0 mole percent of a compound having the formula $N_3P_3Cl_z(OR')_{6-z}$, wherein R' is $C_1$ to $C_{10}$ linear or branched alkyl or $C_6$ to $C_{10}$ aryl-substituted $C_1$ to $C_{10}$ linear or branched alkyl and $z$ is equal to 0 to 5.

5. The process in accordance with claim 4 wherein said heating is at a temperature of from about 175° C. to about 250° C. for a time from about 5 hours to about 300 hours.

* * * * *